United States Patent [19]
Tsai

[11] Patent Number: 5,094,324

[45] Date of Patent: Mar. 10, 1992

[54] BICYCLE SHOCK-ABSORBING APPARATUS

[75] Inventor: Chin S. Tsai, Taipei, Taiwan

[73] Assignee: Dah Ken Industrial Co., Ltd., Taipei, Taiwan

[21] Appl. No.: 680,886

[22] Filed: Apr. 5, 1991

[51] Int. Cl.⁵ .............................................. F16F 9/06
[52] U.S. Cl. ................................ 188/269; 188/322.15; 188/322.21; 188/322.22; 280/276
[58] Field of Search ............... 188/266, 269, 280, 282, 188/322.11, 322.15, 322.21, 322.22; 280/275, 276, 283, 284; 267/64.17, 64.26

[56]  References Cited
U.S. PATENT DOCUMENTS 4,376,472  3/1983  Heyer et al. .................. 188/322.22
4,971,344  11/1990  Turner ............................... 280/276

Primary Examiner—Robert J. Oberleitner
Assistant Examiner—Chris Schwartz
Attorney, Agent, or Firm—Varndell Legal Group

[57] ABSTRACT

A bicycle shock-absorbing apparatus comprises an inner tube, a valve device, and an outer tube. The inner tube is inserted into the outer tube, with the valve device disposed at the bottom thereof to control the flow of damping oil between the tubes: upward therethrough into the inner tube when the bicycle receives a shock, and downward therethrough into the outer tube when the bicycle is unstressed.

3 Claims, 4 Drawing Sheets

BICYCLE SHOCK-ABSORBING APPARATUS

BACKGROUND OF THE INVENTION

This invention relates to a bicycle shockabsorbing apparatus, and more particularly, to an apparatus that inserts an inner tube into an outer tube.

A conventional bicycle does not have any shockabsorbing apparatus attached to either the front or rear wheel axle. Therefore, a biker will feel uncomfortable when passing over a rugged road. In addition, long term use on a rugged road will damage the bicycle. With the above drawback, the bicycle needs to be improved to have better performance.

An off-road bicycle (or a mountain bicycle) is popularly used for sport and leisure. Therefore, a safe and error-free bicycle is a basic requirement for offroad use. A number of front fork designs have been disclosed for off-road motorcycles. However, a bicycle is quite different than a motorcycle in many ways, such as the momentum of a motorcycle is much greater than that of a bicycle under normal use, for a motorcycle has a greater mass and is used at higher speeds than those of a bicycle. Therefore, simply adapting a current motorcycle shock-absorbing apparatus onto a bicycle is not feasible.

U.S. Pat. No. 4,971,344, teaches a bicycle with a front fork wheel suspension that utilizes a pair of telescoping tubes and a spring-loaded valve, so that the latter can regulate the flow of fluid between the pair of telescoping tubes and thus absorb shock from a load.

SUMMARY OF THE INVENTION

It is an object of the present invention to provide a bicycle shock-absorbing apparatus which adjusts the oil pressure and air pressure inside a pair of tubes to absorb shock from a rugged road, while not affecting the pedal drive energy, so as to maximize the shock absorbing effect by means of a light construction.

It is another object of the present invention to provide a bicycle shock-absorbing apparatus, that controls the flowing of damping oil therein, providing a buffering elasticity to achieve a shock-absorbing effect and prolonging the life of the bicycle.

It is still another object of the present invention to provide a bicycle shock-absorbing apparatus with an air inflation valve and an air pressure meter, so that a biker can inflate an appropriate amount of air into the inner tube according to his own weight.

These and additional objects, if not set forth specifically herein, will be readily apparent to those skilled in the art from the detailed description provided hereunder, with appropriate reference to the accompanying drawings.

BRIEF DESCRIPTION OF THE DRAWINGS

FIG. 7 is a top cross-sectional view of the shock-absorbing apparatus and a bicycle fork.

DETAILED DESCRIPTION OF THE PREFERRED EMBODIMENTS

Figure 1:
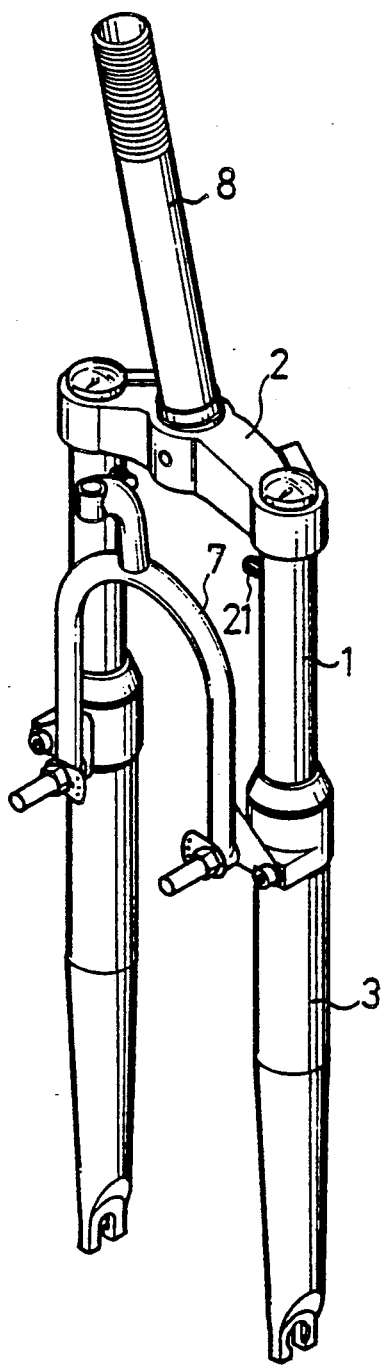
FIG. 1 is a perspective view of a bicycle fork with a shock-absorbing apparatus of a preferred embodiment in accordance with the present invention.
Figure 2:
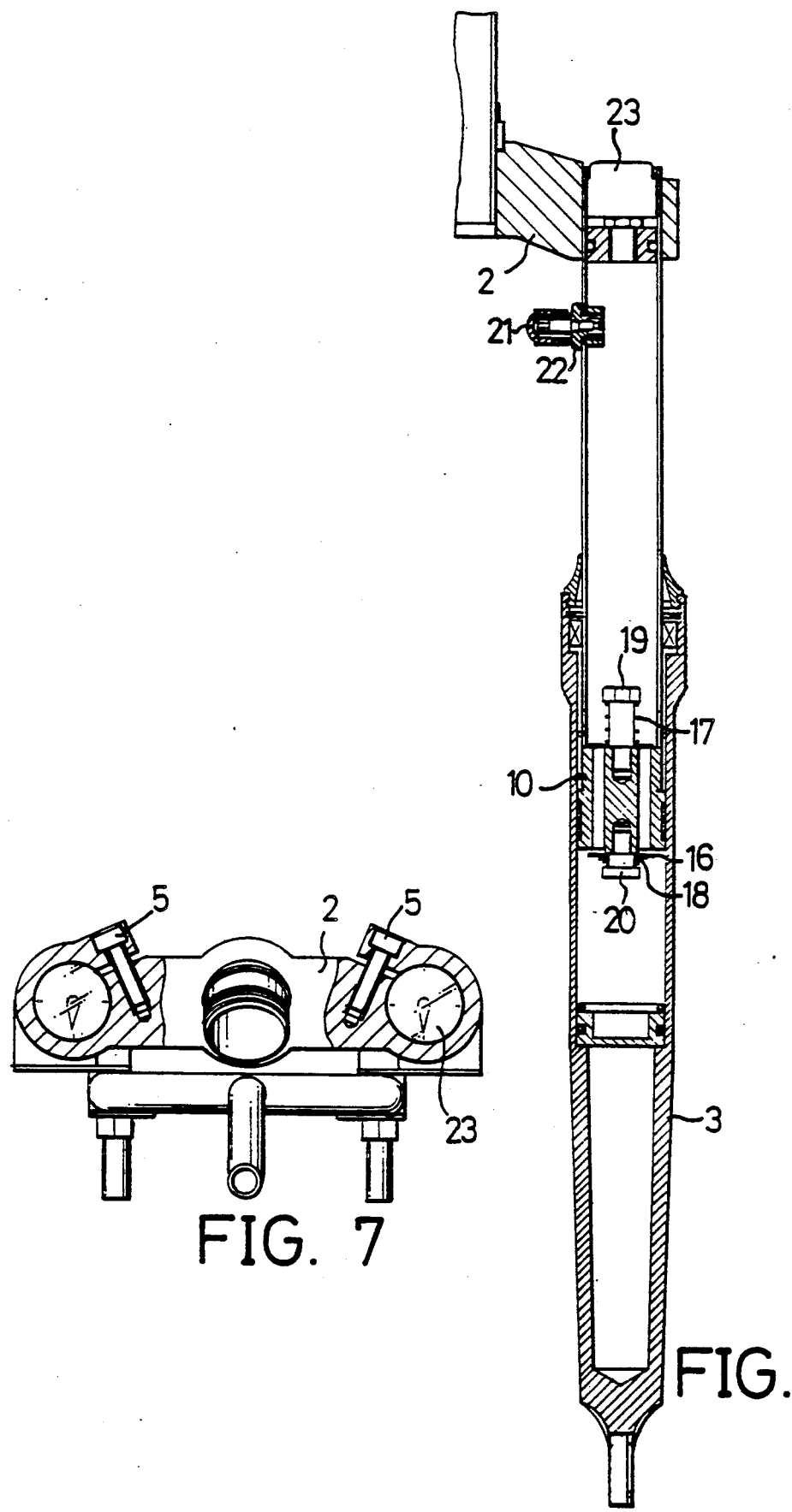
FIG. 2 is a side cross-sectional view of the bicycle shock-absorbing apparatus of FIG. 1.
Figure 3:
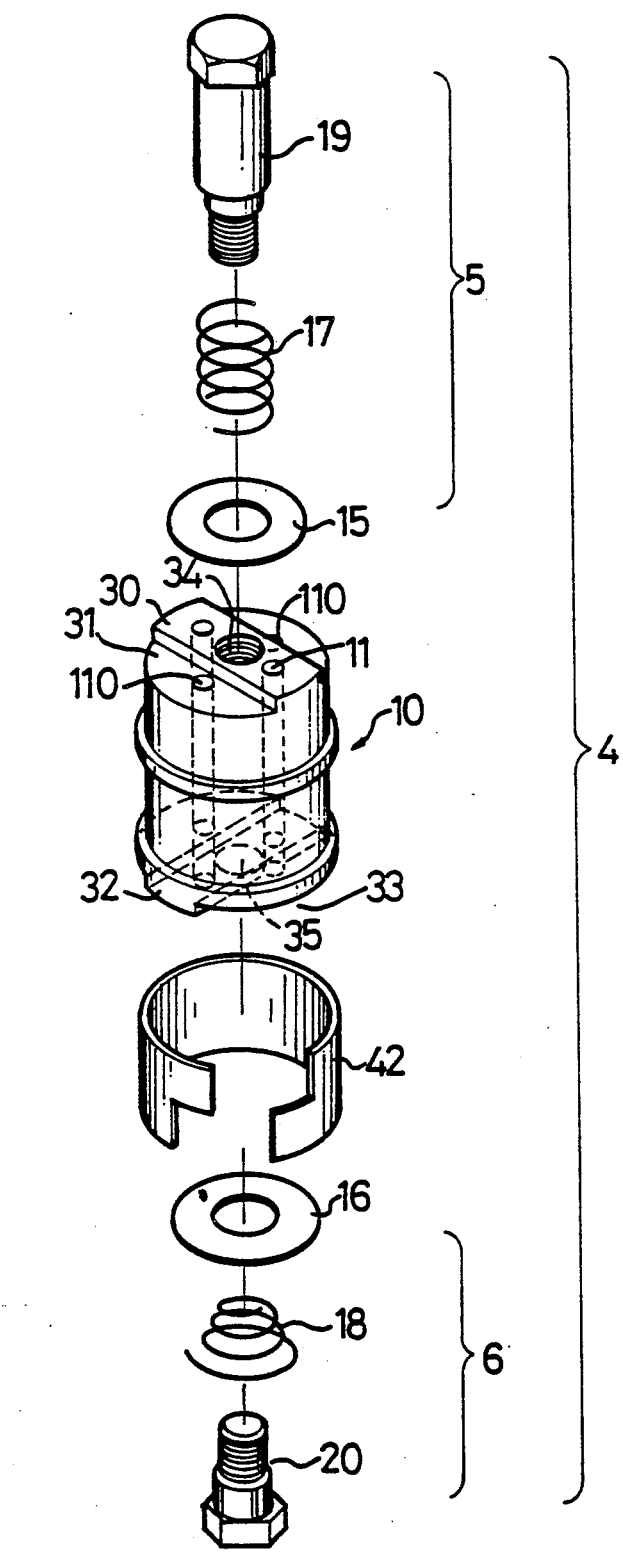
FIG. 3 is an exploded view of a valve means of the shock-absorbing apparatus in accordance with the present invention.

Referring to FIGS. 1 to 3, a bicycle shock-absorbing apparatus comprises an inner tube 1, an outer tube 3, and a valve means 4. An upper terminal of the inner tube 1 is fixedly attached to a bicycle upper crown 2, which in turn, is fixedly attached at a mid-portion thereof to a head tube 8 of the bicycle. A lower terminal of the outer tube 3 is attached to a front wheel axle (not shown). A lower terminal of the inner tube 1 is inserted into an upper terminal of the outer tube 3. The outer tube 3 is filled with damping oil, while a top of the outer tube is sealed by an oil seal 19 to prevent the spilling of oil. The inner tube is filled with damping oil in bottom part thereof. A valve seat 10 is located at a bottom of the inner tube 1, shaped on a top surface thereof with a top protruding portion 30 and a top flat portion 31, and shaped on a bottom surface thereof with a bottom protruding portion 32 and a bottom flat portion 33, with a longitudinal axis of the top protruding portion 30 being perpendicular to that of the bottom protruding portion 32. A top threaded hole 34 is formed in the center of the top protruding portion 30, while a bottom threaded hole 35 is formed in the center of the bottom protruding portion 32.

Figure 4:
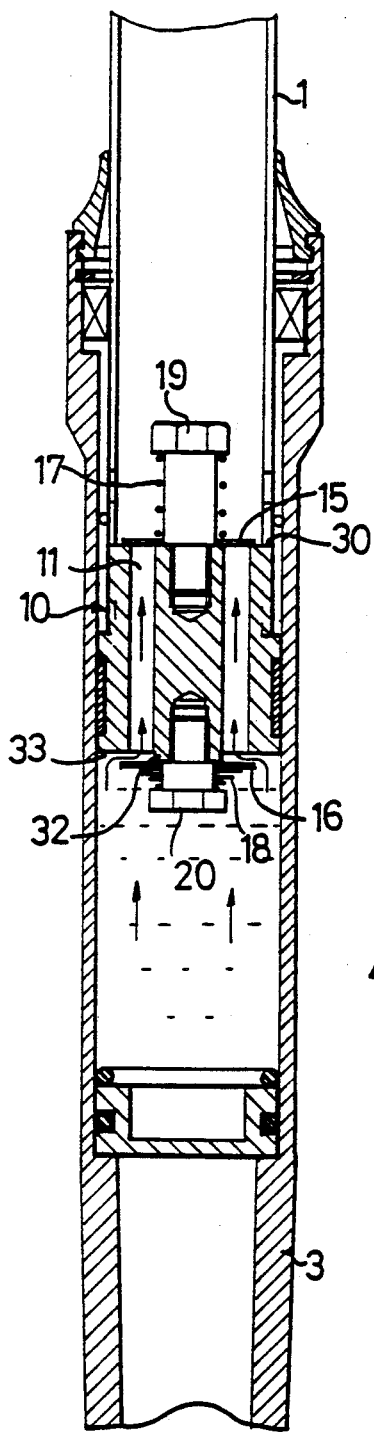
FIG. 4 is a sectional view of the bicycle shock-absorbing apparatus upon initial compression.

An upper spring bias means 5, comprising an upper bolt 19, an upper compression spring 17, and an upper blocking plate 15, controls the opening or closing of a first pair of ports 11. A lower spring bias means 6, comprising a lower bolt 20, a lower compression spring 18, and a lower blocking plate 16, controls the opening or closing of a second pair of ports 110. The upper compression spring 17 has a larger modulus of elasticity than that of the lower compression spring 18. Both springs 17, 18 urge the corresponding blocking plates 15, 16 to respectively abut the first pair of ports 11 and the second pair of ports 110 in a normal mode. As shown in FIG. 4 is the shock-absorbing apparatus changing from the normal mode to a compressed mode. A C-shaped oil seal 42 is disposed around the lower part of the valve seat 10 to prevent the damping oil from flowing through to the outside of the valve seat 10.

Figure 5:
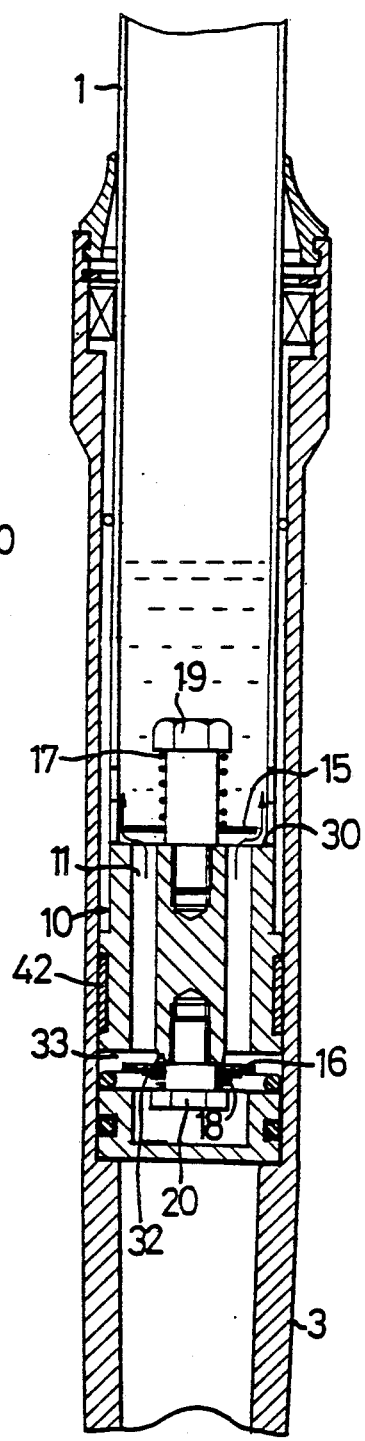
FIG. 5 is a sectional view of the bicycle shock-absorbing apparatus after compression.

Referring to FIG. 5, when a bicycle is ridden on a rugged road, shocks will be transmitted from the ground to the bicycle. At the moment of the shock, the inner tube 1 inserts into the outer tube 3. The damping oil in the outer tube 3 will be forced to flow through the first pair of ports 11, against the upper spring bias means 5, pushing the blocking plate 15 upward, thus entering the inner tube 1. This action further compresses the air at the top of the inner tube 1, thereby absorbing the shock from the road.

Figure 6:
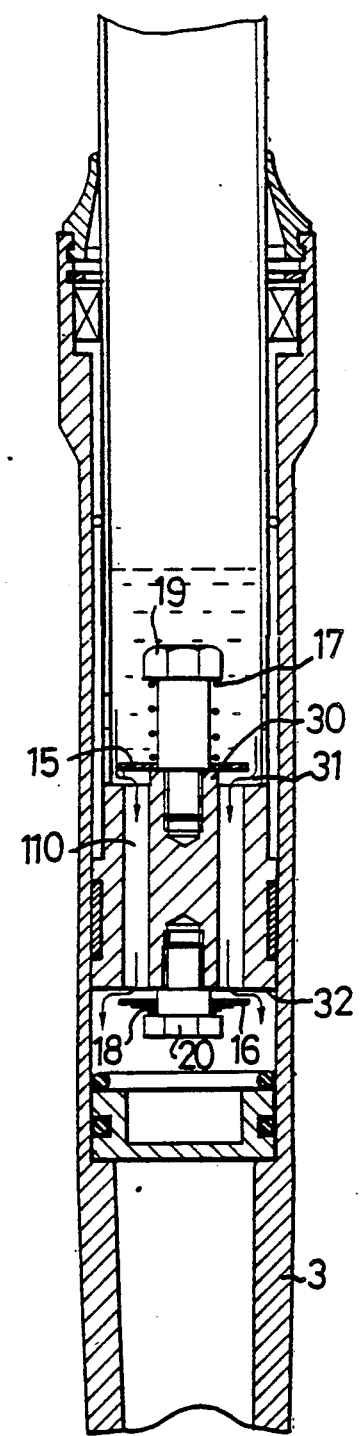
FIG. 6 is a sectional view of the bicycle shock-absorbing apparatus in an unstressed condition after compression.

Referring to FIG. 6, when unstressed, the upper compression spring 17 will return to a normal status (not compressed), with the compressed air at the top of the inner tube 1 pushing the damping oil in the inner tube 1 to flow through the second pair of ports 110, against the lower spring bias means 6, opening the blocking plate 16, and entering the outer tube 3; therefore, the shock-absorbing apparatus returns to a normal mode.

Referring to FIG. 2, an air inflation valve seat 21 is disposed on the upper wall of the inner tube 1, and an air inflation valve 22 is received by the air inflation valve seat 21 for the biker to inflate air into the inner tube 1. An air pressure meter 23 is disposed at the top of the inner tube 1 to measure the air pressure inside the inner tube 1.

FIG. 7 shows that the inner tube 1 is fixedly attached to the upper crown 2 by a fixing means, such as a bolt 5, such that the inner tube 1, the upper crown 2, and the head tube 8 moves downward together when the bicycle receives a shock.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A bicycle shock-absorbing apparatus, comprising a lower tube and an upper tube slidably received within said lower tube, a valve means being disposed at a lower end of said upper tube for regulating a flow of damping oil between said upper tube and said lower tube in response to a shock on the bicycle, said valve means comprising a valve seat, an upper spring bias means, and a lower spring bias means;

said valve seat having a top protruding portion and a top flat portion on the top surface thereof and having a bottom protruding portion and a bottom flat portion on the bottom surface thereof; a longitudinal axis of said top protruding portion being perpendicular to that of said bottom protruding portion;

a first pair of ports being disposed in said top protruding portion, penetrating through said valve seat to said flat bottom portion thereof;

a second pair of ports being disposed in said top flat portion, penetrating through said valve seat to said bottom protruding portion;

an upper threaded hole formed in an upper central part of said valve seat;

a lower threaded hole formed in a lower central part of said valve seat;

said upper spring bias means comprising an upper bolt received in said upper threaded hole, an upper block plate, and an upper spring disposed between said upper bolt and said upper blocking plate to urge said upper blocking plate to abut said first pair of ports;

said lower spring bias means comprising a lower bolt received in said lower threaded hole, a lower blocking plate, and a lower spring disposed between said lower bolt and said lower blocking plate to urge said lower blocking plate to abut said second pair of port;

2. A bicycle shock-absorbing apparatus as claimed in claim 1, wherein an air inlet is disposed in an upper wall portion of said inner tube for inflating air into said inner tubes.

3. A bicycle shock-absorbing apparatus as claimed in claim 1, wherein an air pressure meter is disposed in a top of said inner tube for showing the pressure thereof.

* * * * *